United States Patent [19]
Schmid et al.

[11] Patent Number: 6,080,503
[45] Date of Patent: Jun. 27, 2000

[54] POLYMER ELECTROLYTE MEMBRANE FUEL CELLS AND STACKS WITH ADHESIVELY BONDED LAYERS

[75] Inventors: Ottmar Schmid, Markdorf; Johann Einhart, Uhldingen, both of Germany

[73] Assignee: Ballard Power Systems Inc., Burnaby, Canada

[21] Appl. No.: 09/048,817

[22] Filed: Mar. 26, 1998

[51] Int. Cl.[7] .................................................. H01M 8/10
[52] U.S. Cl. ................................ 429/35; 429/30; 429/34
[58] Field of Search ................................ 429/30, 34, 35, 429/36, 41, 44, 162, 304, 247

[56] References Cited

U.S. PATENT DOCUMENTS

| | | | |
|---|---|---|---|
| 4,397,917 | 8/1983 | Chi et al. | 429/26 |
| 4,505,992 | 3/1985 | Dettling et al. | 429/36 |
| 4,588,660 | 5/1986 | Shimizu et al. | 429/35 |
| 4,732,637 | 3/1988 | Dettling et al. | 156/295 |
| 4,755,429 | 7/1988 | Nickols et al. | 428/408 |
| 4,756,981 | 7/1988 | Breault et al. | 429/42 |
| 4,786,568 | 11/1988 | Elmore et al. | 429/44 |
| 5,021,284 | 6/1991 | Miwa et al. | 428/166 |
| 5,176,966 | 1/1993 | Epp et al. | 429/26 |
| 5,187,025 | 2/1993 | Kelland et al. | 429/33 |
| 5,264,299 | 11/1993 | Krasij et al. | 429/30 |
| 5,284,718 | 2/1994 | Chow et al. | 429/26 |
| 5,350,643 | 9/1994 | Imahashi et al. | 429/33 |
| 5,393,619 | 2/1995 | Mayer et al. | 429/152 |
| 5,523,175 | 6/1996 | Beal et al. | 429/30 |
| 5,733,678 | 3/1998 | Ledjeff et al. | 429/30 |
| 5,858,569 | 1/1999 | Meacher et al. | 429/26 |

FOREIGN PATENT DOCUMENTS

| | | |
|---|---|---|
| 0 083 937 A1 | 7/1983 | European Pat. Off. . |
| 0 331 128 A2 | 2/1989 | European Pat. Off. . |
| 0 122 150 B1 | 9/1989 | European Pat. Off. . |
| 0 604 683 A1 | 7/1994 | European Pat. Off. . |
| 19 64 811 | 7/1971 | Germany . |
| 43 09 976 A1 | 9/1994 | Germany . |
| 43 14 745 C1 | 12/1994 | Germany . |
| 195 42 475 A1 | 5/1997 | Germany . |
| 44 42 285 C1 | 2/1998 | Germany . |
| 0724917 | 3/1994 | Japan . |
| 07235314 | 9/1995 | Japan . |
| WO 94/09520 | 4/1994 | WIPO . |

OTHER PUBLICATIONS

International Search Report issued by British Patent Office corresponding to a foreign counterpart Great Britain patent application Serial No. 9806696.2 dated May 20, 1998.

*Primary Examiner*—Maria Nuzzolillo
*Assistant Examiner*—Monique Wills
*Attorney, Agent, or Firm*—McAndrews, Held & Malloy, Ltd.

[57] ABSTRACT

An electrochemical cell stack comprises a plurality of membrane electrode assemblies interposed between pairs of separator plates. The stack comprises adhesively bonded layers. Preferably each membrane electrode assembly is adhesively bonded to the adjacent pair of separator plates. The adhesive bond between the plate and membrane electrode assembly preferably provides a substantially gas and liquid-tight seal around the perimeter of the electrochemically active area of the membrane electrode assembly and around any fluid manifold openings formed therein. Alternatively, or in addition, adjoining pairs of separator plates in an electrochemical cell stack may be adhesively bonded together. Such pairs of adhesively bonded plates may define cooling spaces between neighboring cells. Stacks comprising a plurality of individual cell modules may be formed, each module comprising a membrane electrode assembly bonded to a pair of separator plates.

3 Claims, 3 Drawing Sheets

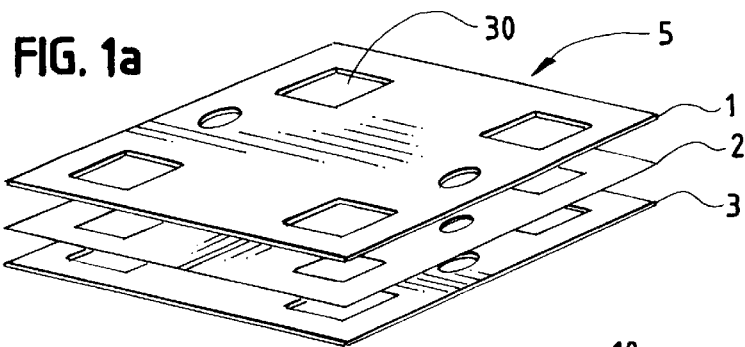
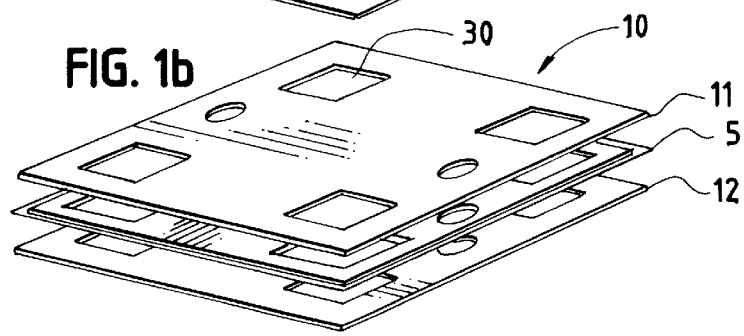
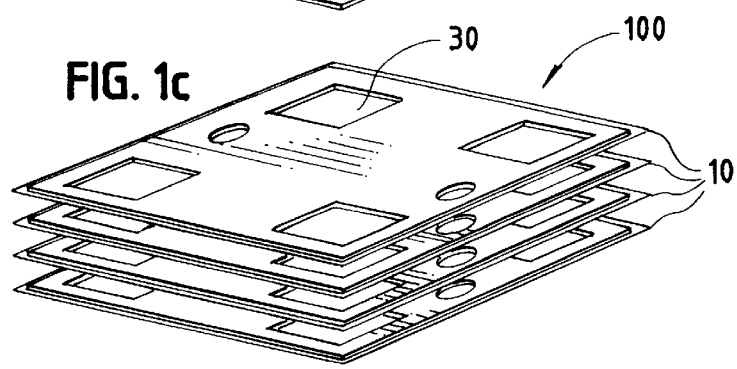
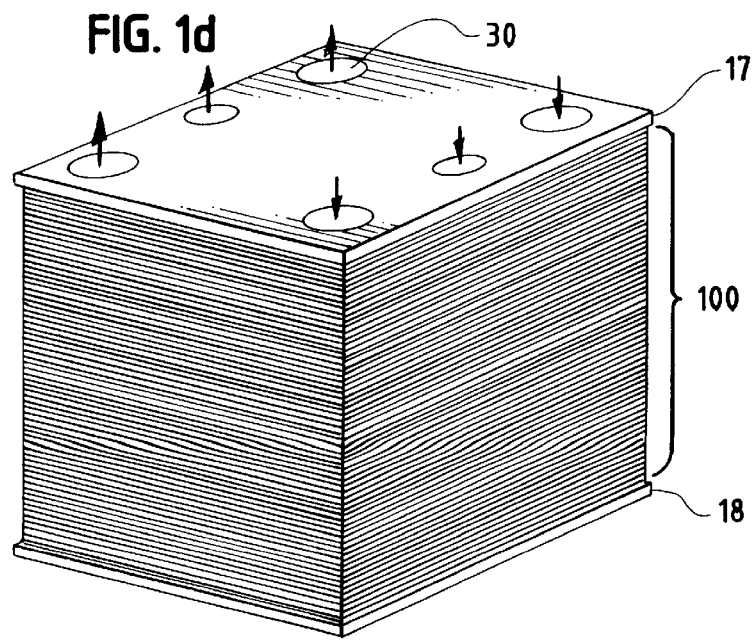

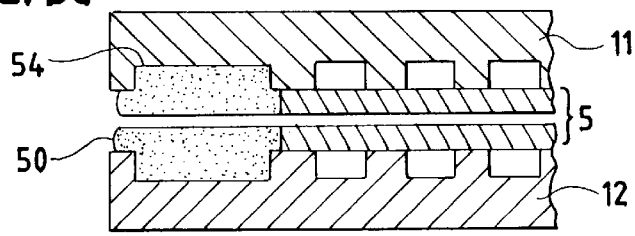
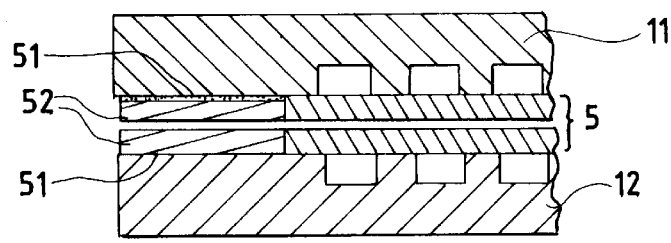
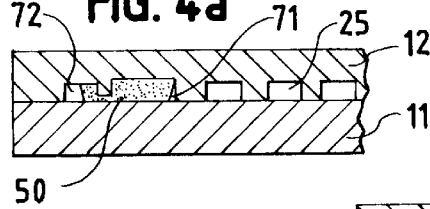 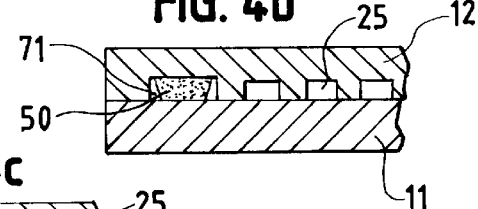
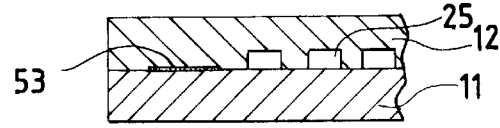
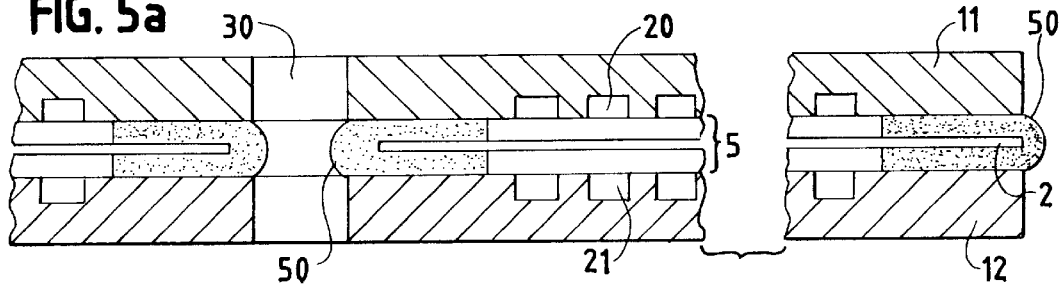
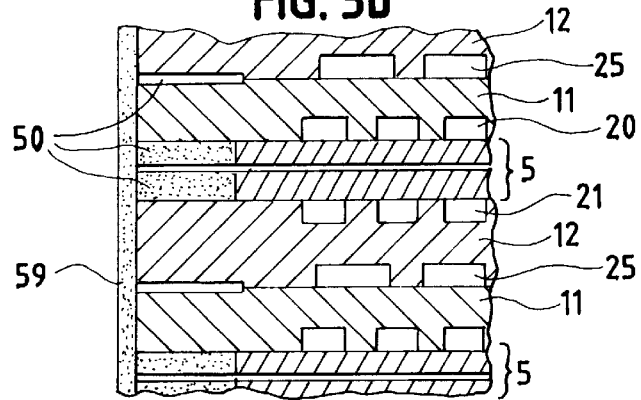

POLYMER ELECTROLYTE MEMBRANE FUEL CELLS AND STACKS WITH ADHESIVELY BONDED LAYERS

FIELD OF INVENTION

The present invention relates to electrochemical energy converters with a polymer electrolyte membrane (PEM), such as fuel cells or electrolyzer cells or stacks of such cells, wherein the cells or stacks comprise adhesively bonded layers.

BACKGROUND

Electrochemical cells comprising polymer electrolyte membranes (PEMs) may be operated as fuel cells wherein a fuel and an oxidant are electrochemically converted at the cell electrodes to produce electrical power, or as electrolyzers wherein an external electrical current is passed between the cell electrodes, typically through water, resulting in generation of hydrogen and oxygen at the respective electrodes of the cell. FIG. 1 illustrates a typical design of a conventional electrochemical cell comprising a PEM, and a stack of such cells. Each cell comprises a membrane electrode assembly (MEA) 5 such as that illustrated in an exploded view in FIG. 1a. MEA 5 comprises an ion-conducting PEM layer 2 interposed between two electrode layers 1,3 which are typically porous and electrically conductive, and comprise an electrocatalyst at the interface with the adjacent PEM layer 2 for promoting the desired electrochemical reaction. The electrocatalyst generally defines the electrochemically active area of the cell. The MEA is typically consolidated as a bonded laminated assembly. In an individual cell 10, illustrated in an exploded view in FIG. 1b, an MEA is interposed between a pair of separator plates 11, 12, which are typically fluid impermeable and electrically conductive. The cell separator plates are typically manufactured from non-metals such as graphite or from metals, such as certain grades of steel or surface treated metals, or from electrically conductive plastic composite materials. Fluid flow spaces, such as passages or chambers, are provided between the plate and the adjacent electrode to facilitate access of reactants to the electrodes and removal of products. Such spaces may, for example, be provided by means of spacers between separator plates 11, 12 and corresponding electrodes 1, 3, or by provision of a mesh or porous fluid flow layer between separator plates 11, 12 and corresponding electrodes 1, 3. More commonly channels (not shown) are formed in the face of the separator plate facing the electrode. Separator plates comprising such channels are commonly referred to as fluid flow field plates. In conventional PEM cells, resilient gaskets or seals are typically provided between the faces of the MEA 5 and each separator plate 11, 12 around the perimeter to prevent leakage of fluid reactant and product streams.

Electrochemical cells with a ion-conductive PEM layer, hereinafter called PEM cells, are advantageously stacked to form a stack 100 (see FIG. 1d) comprising a plurality of cells disposed between a pair of end plates 17, 18. A compression mechanism (not shown) is typically employed to hold the cells tightly together, maintain good electrical contact between components and to compress the seals. In the embodiment illustrated in FIG. 1c, each cell 10 comprises a pair of separator plates 11, 12 in a configuration with two separator plates per MEA. Cooling spaces or layers may be provided between some or all of the adjacent pairs of separator plates in the stack assembly. An alternative configuration has a single separator plate or "bipolar plate" interposed between pairs of MEAs, contacting the cathode of one cell and the anode of the adjacent cell, thus resulting in only one separator plate per MEA in the stack (except for the end cell). The stack may comprises a cooling layer interposed between every few cells of the stack, rather than between each adjacent pair of cells.

The cell elements described have openings 30 formed therein which, in the stacked assembly, align to form fluid manifolds for supply and exhaust of reactants and products and, if cooling spaces are provided, for a cooling medium. Again, resilient gaskets or seals are typically provided between the faces of the MEA 5 and each separator plate 11, 12 around the perimeter of these fluid manifold openings to prevent leakage and intermixing of fluid streams in the operating stack.

In the future it is anticipated that a major area of application for PEM fuel cells, will be for electrical power generation in stationary power plants and portable power generation systems, and for propulsion in motor vehicles. For these applications, a PEM fuel cell service life of at least 10 years is desirable. Production costs are important and will play a central role in the successful commercialization of PEM fuel cells for these applications. Other important considerations when designing a PEM cell are simplicity and cost-effectiveness of maintenance and repair.

The present invention relates to improved sealing and construction of individual PEM cells and stacks of such cells. Conventional PEM cell sealing mechanisms generally employ resilient gaskets made of elastomeric materials, which are typically disposed in grooves in the separator plates or MEAs, for example, as described in U.S. Pat. Nos. 5,176,966 and 5,284,718. Over the course of an electrochemical cell's service life the elastomeric gaskets are subjected to prolonged deformation and sometimes a harsh operating environment. Over time such gaskets tend to decrease in resilience, for example due to compression set and chemical degradation, and may become permanently deformed. This impacts negatively on the sealing function and can ultimately lead to an increased incidence of leaks.

With such gasketed plates, the plastic deformation of the plates increases as the full force of pressure on the sealing area of the plate is continuously applied. Moreover, an uneven gasket pressure force distribution along the length of the stack, with a minimum in the center, can be observed in stacks using such a sealing mechanism. Thus, the sealing elements of the cells are typically exposed to higher pressure in the end plate areas in order to guarantee adequate sealing performance in the center cells of the stack. Increased sealing pressure applied to the cells in the end plate areas may then lead to increased plastic deformations and a shorter time to gasket failure.

The assembly of a PEM cell stack which comprises a plurality of PEM cells each having many separate gaskets which must be fitted to or formed on the various components is labor-intensive, costly and generally unsuited to high-volume manufacture due to the multitude of parts and assembly steps required. Further, in the design and manufacture of PEM cells, in order to achieve the desired specifications, such as increased power density, there is a desire to make the individual cell elements thinner. Accordingly, there will be finer dimensional tolerances required for such thin cell elements and it will become more difficult to design gaskets which will maintain high dimensional tolerances, despite the use of highly elastic materials, as even highly elastic materials have a limited elastic deformation range.

With conventional PEM cell designs, it is sometimes difficult to remove and repair an individual cell or to identify or test which cells in a stack may require repair. Furthermore, disassembly of a stack consisting of multiple cells each comprising separate cell components can be very costly as in many instances, after the removal of one cell, the gaskets of all the remaining cells may need to be replaced before the stack can be reassembled and reused.

Another disadvantage of conventional PEM cells arises because the PEM typically projects beyond the edges of the electrodes and cell separator plates around the perimeter and around manifold openings. The projecting portion of the PEM may serve to avoid short circuits between plates, and it typically contacts and cooperates with the gaskets to form the fluid seal between the MEA and separator plates. However, such designs tend to leave the PEM edge exposed to air and/or reactant or coolant streams. Exposure to air or other dry gas streams can cause drying of the PEM beginning from the edge and moving towards the center. Drying of the membrane can lead to permanent damage to the membrane, reduced cell performance and ultimately malfunction of the PEM cells. Exposure of the PEM edge to some coolants and other streams can result in physical and/or chemical damage to the membrane or electrodes.

German printed patent application number DE 44 42 285 describes a PEM cell stack where individual components of the stack are mechanically pressed together with a frame element or clamp of U-shaped cross-section. Specifically, the edge portions of two separator plates are pressed against the membrane, which is disposed between them, to form a gas-tight seal.

The European published application EP 0 331 128 and related U.S. Pat. No. 4,786,568 disclose a liquid electrolyte fuel cell with a porous electrode substrate which has a sealant material injected into a marginal edge portion thereof.

EP 0 122 150 describes a fuel cell stack with liquid, fixed electrolytes. In this stack array, two adjacent, porous and gas-bearing plates are bonded or glued together across their entire surface, in a face-to-face bond. The purpose of this arrangement is to keep the gases in the two gas-bearing plates separated from one another.

In the EP 0 083 937 and related U.S. Pat. No. 4,397,917, individual components of a fuel cell stack are glued together with an adhesive material. The purpose of this arrangement is to solidly join the components to form a stack, and not to reliably seal the gas spaces.

DE 19 64 811 discloses a fuel cell stack where the electrodes are attached inside a sectional plastic frame, respectively, and where the sectional frames are glued together in a gas and liquid-tight manner.

An improved electrochemical PEM cell uses an adhesive bonding agent between individual PEM cell components and/or between adjacent PEM cells in a stack. The present approach provides a simplified PEM cell and stack design with a reduced part count, and associated manufacturing and cost benefits. Sealing is generally more reliable with this approach, and embodiments of the present construction may permit easier stack disassembly, testing, repair and maintenance.

SUMMARY OF THE INVENTION

In one embodiment, an electrochemical PEM cell comprising a membrane electrode assembly interposed between a pair of separator plates further comprises a substantially gas and liquid impermeable adhesive bond between each separator plate and the MEA in those regions of the cell where sealing is necessary or desirable. Thus, adhesive materials (otherwise commonly referred to as adhesives, bonding agents, glues or cements) are employed to form a seal and bond, for example, around the perimeter of the electrochemically active area of the MEA and around fluid manifold openings formed in the cell elements, while consolidating individual components of the PEM cell into a unitary structural unit. Preferably an adhesive bond, and thereby a seal, is formed between each separator plate and the membrane of the MEA. In the present approach the MEA is firmly bonded or adhered to the separator plates such that force would be required to separate the components. This contrasts with conventional PEM cell elastomeric seals or gaskets which may be attached to one component but are not bonded to both components between which they are forming a seal.

In the MEAs, the polymer electrolyte membrane may extend or protrude beyond the edges of the electrodes or may be coextensive with the electrodes. Either way, in preferred embodiments, the adhesive bonding agent encapsulates edge portions of the polymer electrolyte membrane. Thus, the adhesive bonding agent covers the cross-sectional edge of the membrane in addition to adjacent portions of the membrane's major surfaces. The adhesive may be impregnated into the porous electrode structure in the edge portions thereof. Besides providing a reliable, gas and liquid-tight bond of the elements, such an arrangement also protects the membrane from drying-out and exposure to the ambient environment and/or fluid streams in an operating cell.

The adhesively bonded electrochemical PEM cells described above may also be stacked or layered to form a PEM cell stack. In such a stack, the anode separator plate of one cell may also serve as the cathode separator plate of an adjacent cell, the bipolar separator plates being adhesively bonded to two MEAs disposed on opposite sides thereof. In this way some of all of the cells in the stack may be adhesively bonded together. Further stack components such as end plates and bus plates may also be adhesively bonded to adjacent components if so desired.

Alternatively the stack may comprise a plurality of stacked individual "PEM modules", each PEM module comprising a membrane electrode assembly interposed between and adhesively bonded to a pair of separator plates. Stacked PEM modules may be electrically connected in parallel, but are more commonly connected in series through plate-to-plate contact of adjacent modules. The stacked PEM modules are preferably compressed between two end plates in order to maintain good electrical plate-to-plate contact between adjacent modules.

It can be advantageous to build PEM cell stacks comprising a plurality of PEM modules which are not adhesively bonded to each other, as this may allow for easier identification of defective modules and subsequent repair or replacement, as individual modules can be removed and tested without damage to the sealing mechanisms of other cells in the stack.

However, in an alternative embodiment of a stack comprising PEM modules, separator plates of adjacent PEM modules may be adhesively bonded together. They may be bonded across substantially their entire contacting surfaces or, similar to the adhesive bond between the MEA and each separator plate, the separator plates of adjacent modules may be joined with an adhesive around their perimeter and around any fluid manifold openings. The two adjacent separator plates may define a cooling space through which a coolant stream is directed in an operating stack. For example, cooling spaces typically take the form of grooves formed in the surface of at least one of the two adjacent separator plates. The adhesive bond between adjacent separator plates preferably provides a substantially gas and liquid impermeable perimeter seal for the cooling space.

Electrochemical PEM cell stacks comprising cooling layers formed by adhesively bonding pairs of adjacent separator plates may also be used in stacks where the PEM cell MEAs are not adhesively bonded to the separator plates. In this case, conventional sealing mechanisms could be used to seal around the MEAs.

In the embodiments described above, preferred adhesives are physically and chemically stable and compatible with the PEM cell and/or stack components and with the reactant, product and coolant streams, in the cell operating environment. For example, the adhesives used are preferably compatible with the electrocatalyst and polymer electrolyte membrane, particularly if the adhesive will be in direct contact with the membrane and/or electrodes. For contact with the MEA and/or reactants, adhesives which are substantially ion-impermeable, or at least have a low ion permeability, and which are stable in an acidic environment are preferred. The adhesive may form a rigid bond or a resilient bond. The adhesive may be selected to be electrically conductive or electrically insulating depending on the components to be bonded. For example, if the adhesive is forming a plate-to-plate bond between adjacent separator plates or PEM modules in a series connected stack, an electrically conductive adhesive will generally be preferred. However, if the adhesive is encapsulating the edge portion of the membrane and interconnecting the anode and cathode electrodes or plates of a single PEM cell, the adhesive should be electrically insulating to avoid short circuiting the cell. The adhesive is preferably a flow processable or formable liquid or paste, however adhesive films may be used. The following are merely examples of adhesive bonding agents which may be suitable for use in some of the described embodiments:

- epoxy resins, such as, for example, 9223-2 (manufacturer: 3M) or AY 105/HY991 (manufacturer: CIBA);
- methacrylate resins;
- PUR, such as, for example, Araldite 2018 (manufacturer: CIBA); and
- ALIPS, such as, for example, FEC2234 (manufacturer: Morton).

The adhesive may be applied to the various PEM cell components using a variety of techniques or processes including, but not limited to, screen printing, dispensing, spraying, roll coating and injection molding.

In any of the embodiments described above the electrochemical PEM cell is preferably a PEM fuel cell or an electrolyzer cell. However, the present approach may be applicable to other types of electrochemical cells such as batteries and methanol/air cells.

Furthermore, the present approach is applicable with practically any cell geometry or configuration such as, for example, square or round embodiments. Moreover, the present approach may also be used in designs where the fluid supply and exhaust manifolds are external manifolds located outside the active cell surface or internal manifolds formed by aligned openings within the electrochemically active area of the cells.

BRIEF DESCRIPTION OF THE DRAWINGS

The preferred embodiments of the invention will be explained in more detail with reference to the figures:

FIG. 1 is an exploded view of a conventional electrochemical PEM cell stack;

FIG. 4 depicts sectional views of edge regions of a pair of separator plates showing several configurations of the adhesive seal which bonds the two adjacent separator places together; and FIG. 5 depicts sectional views of edge regions of a PEM module showing several embodiments of perimeter adhesive seal between the MEA and separator plates, where the membrane edge is encapsulated by an adhesive.

DETAILED DESCRIPTION OF THE PREFERRED EMBODIMENTS

Figure 2:
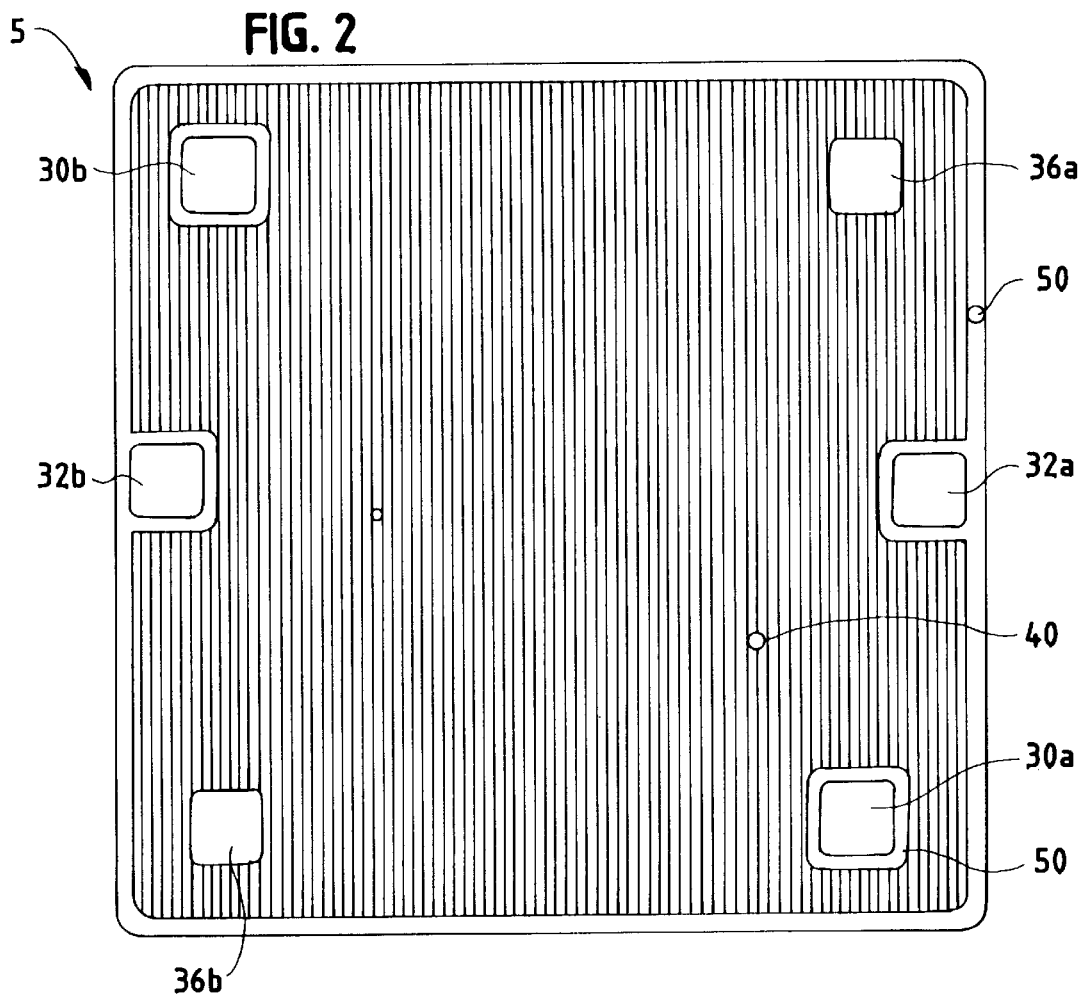
FIG. 2 is a top plan view of an MEA showing an embodiment of the invention with an adhesive forming a perimeter seal and bond around a major surface of the MEA and the manifold openings formed therein.

With reference to FIG. 2 which shows a plan view of a major surface of an MEA 5, adhesive bonding agent 50, used to seal the MEA to the adjacent separator plate around the fluid flow spaces, is located in the edge areas of MEA 5, circumscribing the electrochemically active area 40 of a major surface of MEA 5. MEA 5 has three fluid inlet manifold openings 30a, 32a and 36a, via which the reactants and, if required, a cooling medium may be supplied. Corresponding fluid outlet manifold openings 30b, 32b and 36b are also provided. Depending on the cell design and whether or not a particular fluid is to be directed to the adjacent fluid flow space, the individual manifold openings may or may not have adhesive forming a seal around them.

In the MEA example depicted by FIG. 2, manifold openings 36a and 36b, which are not equipped with a adhesive perimeter seal, serve for exhausting and supplying a first reactant stream. Openings 30a, 30b and 32a, 32b, which are equipped with perimeter adhesive seals, serve for exhausting and supplying a second reactant and a cooling medium, respectively.

With reference again to FIG. 2, fluid manifold openings 30, 32, and 36 are arranged inside the electrochemically active area of MEA 5. Adhesive bonding agent 50, used for sealing the gas spaces, runs along the outer edges of MEA 5. However, in a further embodiment (not shown) it is also possible to arrange the openings outside the electrochemically active area of MEA 5 (by analogy with FIG. 5 of European Patent Publication EP 0 604 683 A1 which is incorporated herein by reference). In such an embodiment, the adhesive bonding agent used for sealing the gas spaces may run not along the outer edge of the MEA, but along the edge of the electrochemically active area of the MEA.

MEA 5 is thus adhesively joined with the adjacent separator plates to form a consolidated mechanical unit by means of an adhesive. The bond provides a gas and liquid-tight seal.

The following are examples of possible MEA configurations:

a) An MEA comprising a polymer electrolyte membrane, which is not completely covered by porous electrode layers (comprising electrocatalyst) bonded to its two major planar surfaces or faces. The membrane extends or protrudes beyond the electrodes around the perimeter of the MEA and around any manifold openings formed therein; and b) An MEA comprising a polymer electrolyte membrane with adjacent porous electrode layers on both sides, which are bonded to the membrane and cover substantially the entire surfaces of the membrane. The membrane is coextensive with the electrodes.

These and other MEA configurations may be used in the embodiments described.

The sectional views of FIG. 3, which each show the edge portion of an individual PEM module, illustrate three examples of different separator plate designs used to accommodate an adhesive seal. The respective MEA 5, comprises polymer electrolyte membrane 2 and two porous electrodes 1, 3 disposed adjacent the membrane faces. Cell separator plates 11 and 12 are disposed on either side of MEA 5. Cell separator plates 11 and 12 have grooves 20 and 21 on their respective surfaces facing MEA 5, forming fluid reactant flow passages adjacent electrodes 1 and 3.

The specific design of the adhesive bond may take many forms, in cooperation with the configuration of the PEM cell components, such as, for example, separator plates 11 and 12, as exemplified by the embodiments shown in FIGS. 3a, 3b, 3c, and 3d.

Figure 3A:
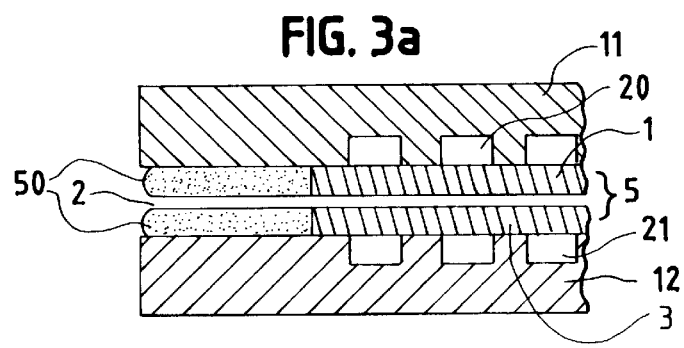
FIG. 3 depicts sectional views of edge regions of a PEM module showing several configurations of the perimeter adhesive seal which bonds a pair of separator plates to an MEA.
Figure 3B:
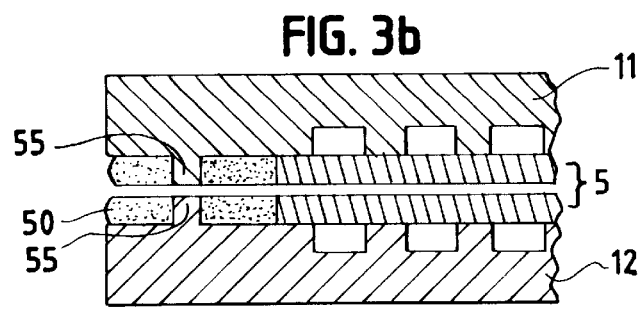

In the embodiments of FIG. 3, a gas and liquid-tight bond is formed between MEA 5 and two adjacent separator plates 11 and 12. In FIGS. 3a, 3b and 3c, the adhesive bonding agent 50 contacts the membrane 2 on each side. The membrane 2 may or may not extend significantly beyond the electrodes 1,3, as described above. If the membrane does not protrude, the bond is achieved by impregnating essentially the entire thickness of a portion of the porous electrode layers in the sealing regions with adhesive bonding agent 50, so that it contacts the membrane. Even if the membrane does protrude it is advantageous to impregnate at least a narrow strip of the porous electrodes with the adhesive. For these embodiments the adhesive bonding agent 50 is generally applied to the MEA, and the MEA 5 is consolidated with the separator plates 11, 12 immediately after the application of adhesive or at least before full hardening of the adhesive. Openings for fluid manifolds may be sealed in the same fashion.

In the embodiment depicted in FIG. 3b, a fixed distance between cell separator plates 11 and 12 and membrane 2 is achieved in the sealing region through a support structure in the form of one or more support ribs 55, which are formed as protrusions on cell separator plates 11 and 12. This may provide a more uniform layer thickness of adhesive bonding agent 50 between membrane 2 and plates 11, 12.

In the embodiment depicted in FIG. 3c, grooves 54 are located on the surfaces of separator plates 11 and 12 facing MEA 5, respectively, to accommodate adhesive. Grooves 54 may compensate for imprecision in the applied adhesive dosages and may ensure a sufficient quantity of adhesive to form an adequate bond can be accommodated between the components. Furthermore, grooves 54 increase the possible range of resilience for compensating thermal expansion when an elastic or resilient adhesive is used.

In another embodiment depicted in FIG. 3d, the sealing region of the porous electrode layers of MEA 5 is impregnated with a sealant or adhesive material 52. After material 52 has hardened, the firm bond of MEA 5 with cell separator plates 11 and 12 is achieved in a second step by means of adhesive bonding agent 51. Adhesive films, for example, may be used as adhesive bonding agent 51.

As explained above, in a PEM cell stack, cooling spaces may be arranged between adjacent individual cells. The distribution of the cooling spaces within the stack is a matter of design choice. For example, individual cells and cooling spaces may be arranged alternately so that each individual cell has a corresponding cooling space. However, other arrangements are also possible, for example, another arrangement may provide for a cooling space after every second or third cell. With reference to FIG. 4, such cooling spaces 25 may be defined by a pair of adjacent separator plates 11, 12, one from each of the two adjacent individual PEM cells. Cooling spaces 25 are formed by depressions, e.g. grooves or channels formed in at least one of the two cell separator plates 11, 12.

Similar to the sealing of the reactant fluid spaces described above with reference to FIG. 3, it is desirable to seal the cooling spaces by means of an adhesive bond between the two separator plates 11, 12 which define the cooling spaces. Preferably, an adhesive is used to seal around the perimeter of the separator plates 11, 12 and around fluid manifold openings in the plates. Such cooling layers, formed by adhesively bonded plates, may be used in stacks with conventional cells where the MEAs are not bonded to the separator plates, or in combination with the approach described above.

Examples of preferred embodiments of adhesive sealing around the cooling spaces between adjacent plates are depicted in FIGS. 4a, 4b and 4c which show the edge area of two adjacent separator plates 11 and 12, and grooves in one of the separator plates 12 form cooling spaces 25. In the embodiment depicted in FIGS. 4a and 4b, groove 71 in plate 12 is used to accommodate most of the adhesive 50. Groove 71 facilitates the application of the adhesive material 50, provides an enclosure for the adhesive material and permits full contact between separator plates 11 and 12 which may be pressed together until contact is made. In the embodiment of FIG. 4a, an adhesive overflow groove 72 is provided. With reference to the embodiment of FIG. 4c, an adhesive material film 53 or an adhesive material foil is located between the two separator plates 11, 12 to create a firm bond. The plates may be adhesively bonded across substantially their entire contacting surfaces. If the plates are to be electrically connected it is preferable to use an electrically conductive adhesive.

FIG. 5 shows two embodiments of an adhesively bonded PEM module which may protect the membrane, for example, by reducing the tendency for the membrane to dry out. In the embodiment of FIG. 5a, the cross section on the left depicts the edge area of a PEM module surrounding a fluid manifold opening 30, which forms part of a fluid manifold, and the cross section on the right depicts the perimeter of the PEM module. Separator plates 11 and 12 are adhesively bonded to MEA 5 as described for FIG. 3a. Unlike in FIG. 3a, however, adhesive bonding agent 50 encapsulates the edge portion of the membrane 2, enclosing it on three sides, where it would otherwise be exposed and vulnerable to damage. This can reduce or prevent the drying-out of polymer electrolyte membrane 2 at the edges. In order to prevent a short circuit current between separator plates 11 and 12 across an individual cell via the adhesive bonding agent 50, the bonding agent must be electrically non-conductive in this design.

The embodiment depicted in FIG. 5b shows the edge area of a stack comprising several stacked PEM modules. MEA 5 and corresponding separator plates 11 and 12 are shown, as well as cooling spaces 25 located between the individual cells. The adhesive bond between the individual elements is achieved in accordance with the explanations given above. In addition, layer 59 made of an adhesive bonding agent, may be applied onto or in the stack. Layer 59 covers, in particular, the edge faces of the polymer electrolyte membrane inside MEAs 5, protecting the membrane from drying out.

In order to promote a strong and lasting adhesive bond, it may be advantageous to subject the surfaces of the components to be bonded to the following surface treatments:

Chemical grafting (reactive molecules on the surface)
Corona/Plasma treatment process
Ion procedure
Fluorination
Degreasing/sanding/roughening
Flaming (Silicon procedure).

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. An electrolyzer or fuel cell comprising:

a first separator plate;

a second separator plate;

a membrane electrode assembly interposed between said first and second separator plates, said membrane electrode assembly comprising a polymer electrolyte membrane interposed between first and second electrode layers, wherein said membrane protrudes beyond the edges of said electrode layers; and an adhesive bond formed between a portion of said membrane electrode assembly and each of said separator plates, wherein said adhesive bond between said membrane electrode assembly and said first and second separator plates is formed between said polymer electrolyte membrane of said membrane electrode assembly and said respective first and second separator plates, and wherein said adhesive bond comprises an adhesive bonding agent which encapsulates edge portions of said polymer electrolyte membrane.

2. An electrolyzer or fuel cell comprising:

a first separator plate;

a second separator plate;

a membrane electrode assembly interposed between said first and second separator plates, said membrane electrode assembly comprising a polymer electrolyte membrane interposed between first and second electrode layers; and an adhesive bond formed between a portion of said membrane electrode assembly and each of said separator plates, wherein said adhesive bond between said membrane electrode assembly and said first and second separator plates is formed between said polymer electrolyte membrane of said membrane electrode assembly and said respective first and second separator plates, and wherein said membrane is substantially coextensive with said electrode layers said adhesive bond comprises an adhesive bonding agent which impregnates substantially the entire thickness of said electrode layers.

3. The electrolyzer or fuel cell of claim 2, wherein said adhesive bonding agent encapsulates edge portions of said polymer electrolyte membrane.

* * * * *

UNITED STATES PATENT AND TRADEMARK OFFICE
CERTIFICATE OF CORRECTION

PATENT NO.   : 6,080,503
DATED        : June 27, 2000
INVENTOR(S)  : Ottmar Schmid and Johann Einhart It is certified that error appears in the above-identified patent and that said Letters Patent is hereby corrected as shown below:

<u>Title page,</u>
Item [56], References Cited, OTHER PUBLICATIONS, please include -- German Patent Office First Office Action based on patent application no. 197 13 250.2-45. --

Signed and Sealed this

Twenty-fourth Day of September, 2002

*Attest:*

*Attesting Officer*

JAMES E. ROGAN
*Director of the United States Patent and Trademark Office*